(12) United States Patent
Hohman

(10) Patent No.: US 6,873,263 B1
(45) Date of Patent: Mar. 29, 2005

(54) WATER LEAK DETECTION

(76) Inventor: Leonard M. Hohman, 135 Hillswood Dr., Folsom, CA (US) 95630

( * ) Notice: Subject to any disclaimer, the term of this patent is extended or adjusted under 35 U.S.C. 154(b) by 53 days.

(21) Appl. No.: 10/647,180

(22) Filed: Aug. 25, 2003

(51) Int. Cl.$^7$ .......................... G08B 21/00; G01M 3/04; G01M 15/00; G01L 3/26; G01L 5/15; H02H 3/08; H02H 9/02

(52) U.S. Cl. .................. 340/602; 340/603; 340/604; 340/605; 340/618; 340/620; 73/40; 73/116; 361/93.6

(58) Field of Search .................. 340/602, 603, 340/604, 605, 618, 620; 73/40, 116; 361/93.6

(56) References Cited

U.S. PATENT DOCUMENTS

| | | | |
|---|---|---|---|
| 4,264,902 A | 4/1981 | Miller | 340/604 |
| 5,091,715 A | 2/1992 | Murphy | 340/604 |
| D364,577 S | 11/1995 | Moore | D10/96 |
| 5,469,146 A | 11/1995 | Gurler | 340/605 |
| 5,796,345 A | 8/1998 | Leventis et al. | 340/604 |
| 6,175,310 B1 | 1/2001 | Gott | 340/605 |
| 6,208,262 B1 | 3/2001 | Jones | 340/693.5 |
| 6,526,807 B1 | 3/2003 | Doumit et al. | 73/40.5 |

Primary Examiner—Jeffery Hofsass
Assistant Examiner—Lam Pham
(74) Attorney, Agent, or Firm—Charles M. Kaplan

(57) ABSTRACT

A battery powered water leak detector and audible alarm are held on a credit card sized plastic board that has sufficient unobstructed area for visible messages, such as advertising, to be printed of otherwise affixed thereon.

20 Claims, 6 Drawing Sheets

WATER LEAK DETECTION

BACKGROUND OF THE INVENTION

This invention relates to moisture detectors, and more particularly to water leak detectors and alarms. Prior water leak alarms have been either bulky, complicated, difficult to instal or relatively expensive.

OBJECTIVES OF THE INVENTION

Accordingly, it is an object of this invention to provide a combined water leak detector and audible alarm that is roughly the size of a credit card.

Another object is to provide a water leak alarm that is always on so that activation by the user is not required.

An additional object is to provide a unitary moisture detector and alarm that can be used to display messages or promote or advertise business services or other products.

Another object is to provide water leak detectors and alarms that can be placed almost anywhere without requiring preparation of the location where they are placed.

A further object is to provide a water leak detector that can be tested with a person's wet finger.

An additional object is to provide a corrosion proof and environmentally safe leak detector that has gold plated conductors.

Another object is to provide a water leak alarm that is high pitched so that it will not be mistaken for a smoke alarm.

A further object is to provide small, portable, self-contained water leak detector and alarm promotional cards that are durable, economical, highly attractive, easy to use and maintain, and which do not possess defects found in similar prior art leak detection devices.

Other objects and advantages of the moisture alarms incorporating this invention will be found in the specification and claims and the scope of the invention will be set forth in the claims.

DESCRIPTION OF THE INVENTION

Figure 1:
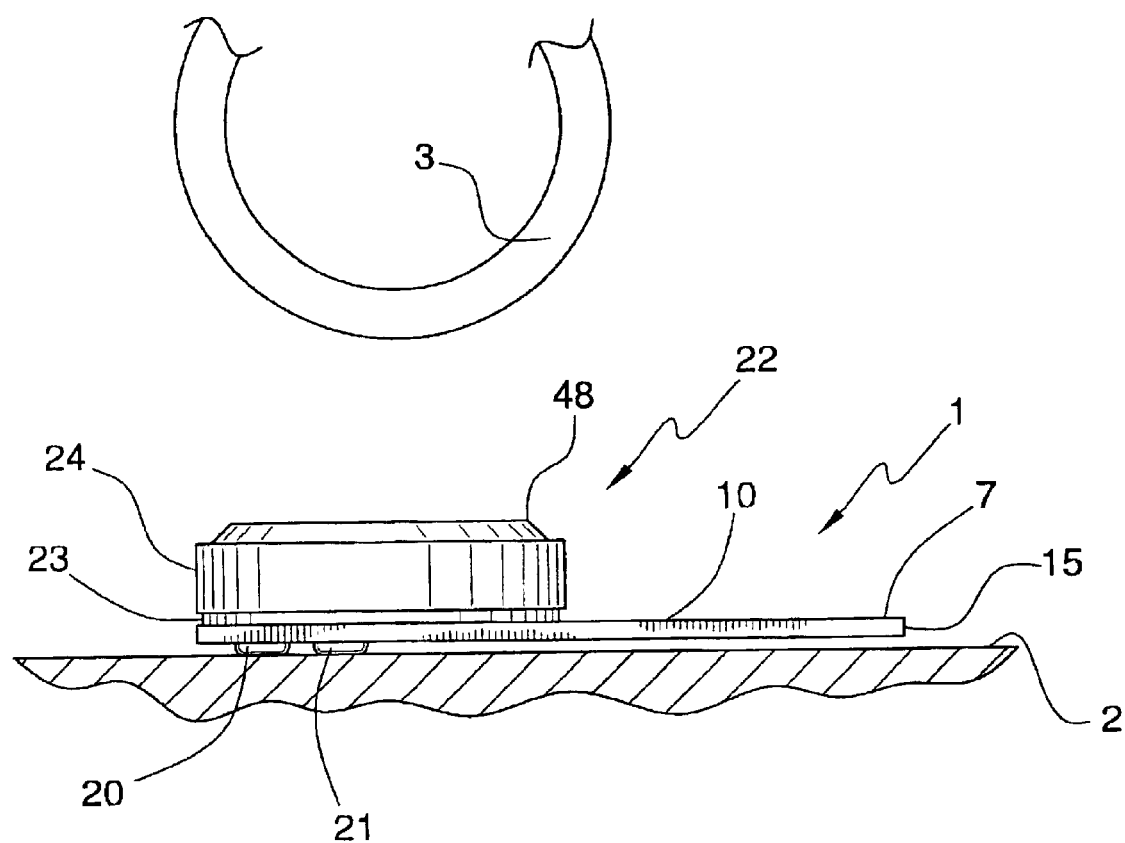
FIG. 1 is a schematic side view of an embodiment of a detector in accord with this invention.
Figure 2:
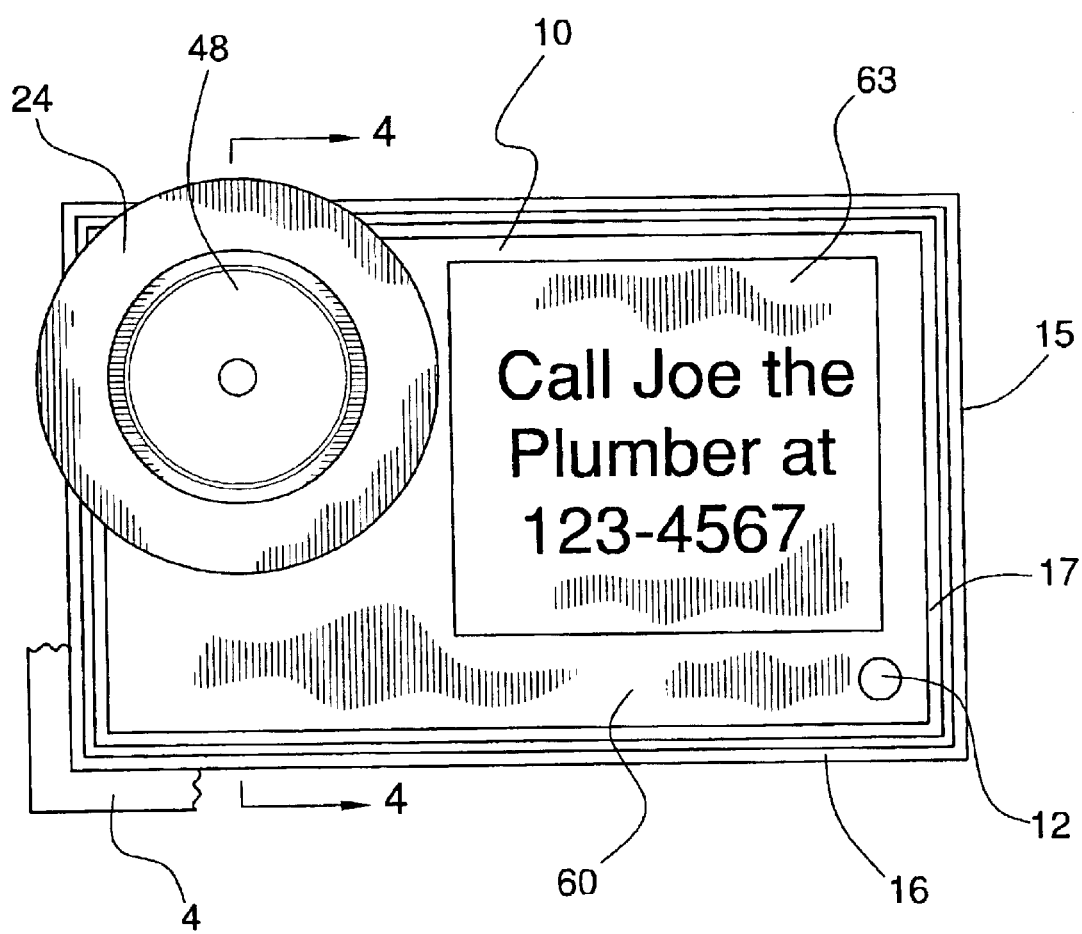
FIG. 2 is a top plan view of the FIG. 1 detector.
Figure 3:
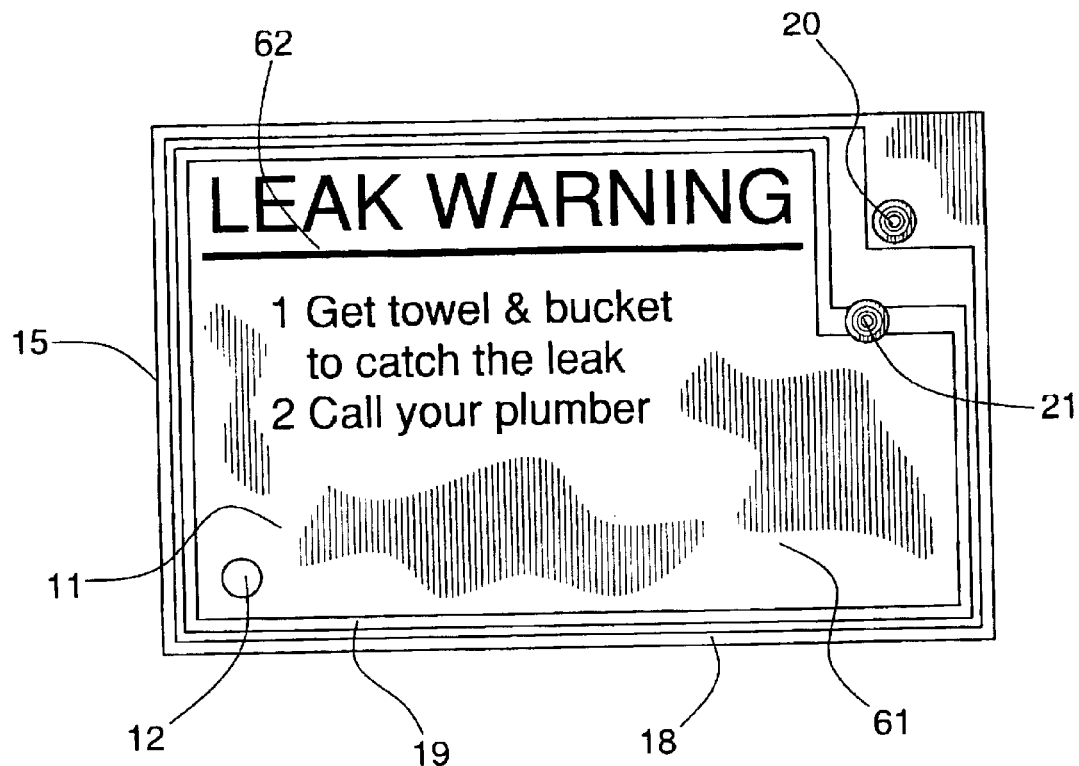
FIG. 3 is a bottom plan view of the FIG. 1 detector.
Figure 4:
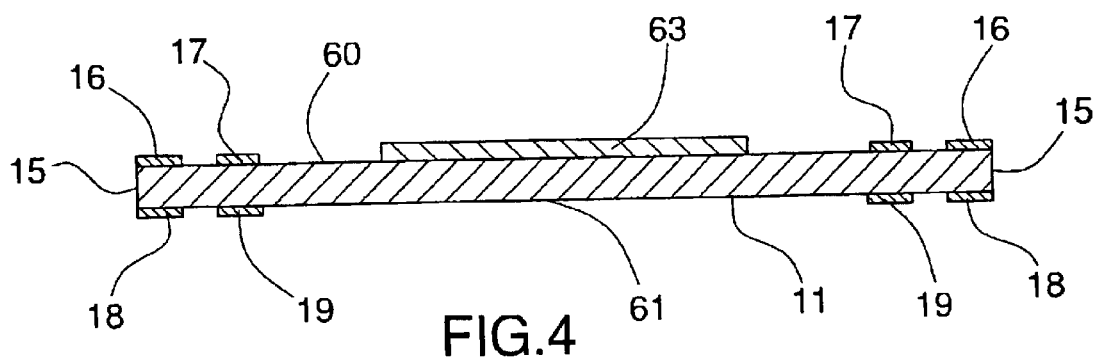
FIG. 4 is a an enlarged cross sectional view taken along the line 4—4 in FIG. 2.
Figure 5:
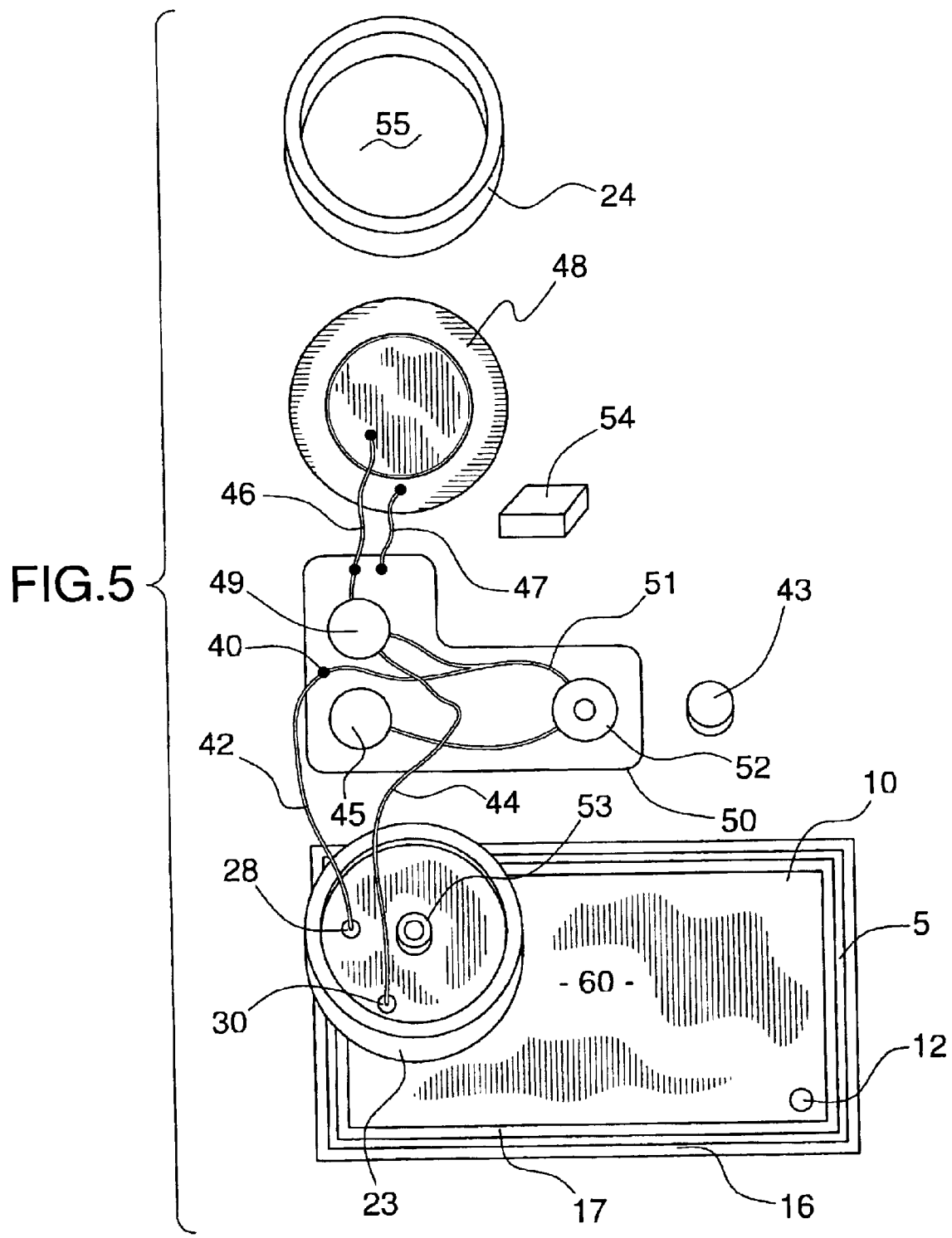
FIG. 5 an exploded view showing the parts of the FIG. 1 detector.

The drawing shows an integral moisture detector, audible alarm and message display card 1. In FIG. 1 the card 1 has been placed on a horizontal surface 2, such as the floor on the inside of a kitchen or bathroom cabinet, that would become wet if plumbing thereabove, such as the kitchen or bathroom sink drain trap 3, were to leak. Other locations where the card 1 could be placed on or near to detect a leak and sound an alarm include fish tanks, bottled water dispensers, refrigerators, dish washers, window sills, hot water heaters, washing machines, toilets, infant baths, flower pots and waterbeds. The card 1 can be placed on top of a sheet 4 of paper towel or napkin to expand the area in which the card will come into contact with moisture. The card 1 can also be placed on any of its sides or edges or hung vertically.

The base of card 1 may be a thin, rigid, moisture proof solid board 7 may be made from non-electrical conducting plastic such as PCB-FR-4 material. The board 7 has a first or upper flat surface 10, and an opposite or lower flat surface 11. The upper and lower surfaces 10 and 11 have end edges 15 around the entire periphery of board 7. A hole 12 through the board 7 may be used to nail or screw the card 1 to any supporting surface, or, with a string or twist tie, to suspend the card 1 in air.

A first water leak or moisture detection conductor strip 16 has been imprinted on the upper surface 10 around the entire periphery of the card. A second water leak or moisture detection conductor strip 17 has also been imprinted on the upper surface 10. The second strip 17 is located within and is completely circumscribed by the first strip 16. The second strip 17 is spaced inwardly away from the first strip 16 in the direction away from the peripheral end edges 15 a distance 5 sufficient to electrically insulate the strips 16 and 17 from each other.

A third water leak or moisture detection conductor strip 18 has been imprinted on the lower surface 11 around the entire periphery of the board 7. A fourth water leak or moisture detection conductor 19 has also been imprinted on the lower surface 11. The fourth strip 19 is located within and is completely circumscribed by the strip 18. The fourth strip 19 is spaced inwardly away from the third strip 18 in the direction away from the peripheral edges 15 a distance 6 sufficient to electrically insulate the strips 18 and 19 from each other.

Figure 6:
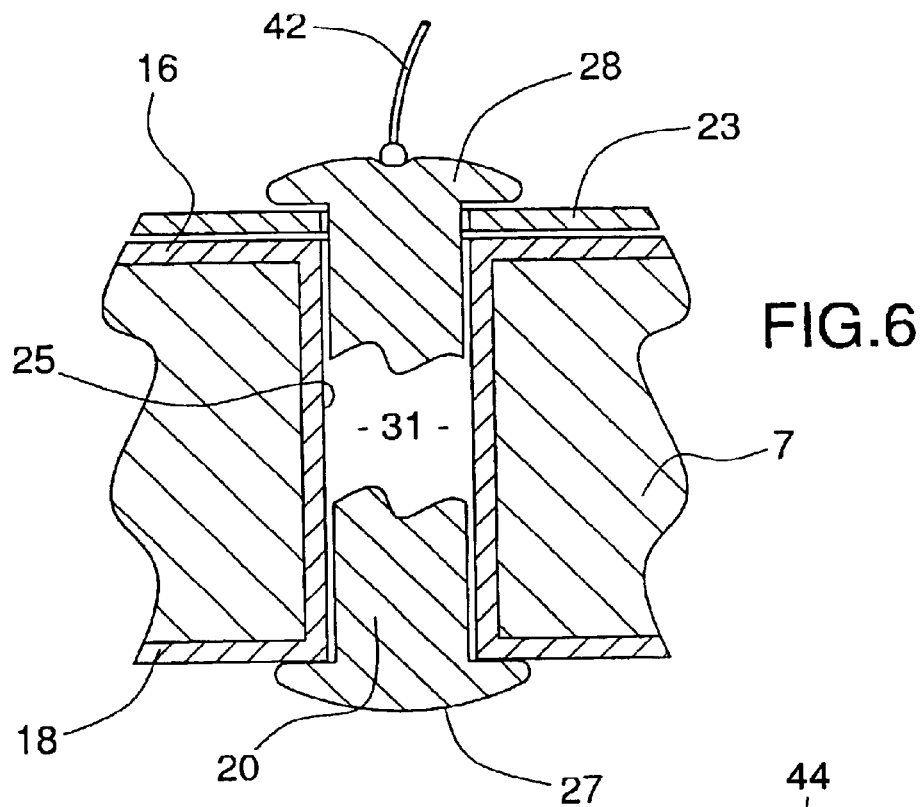
FIG. 6 is an enlarged, schematic, partially cross sectional, fragmentary view of a first rivet in a hole through the detector.
Figure 7:
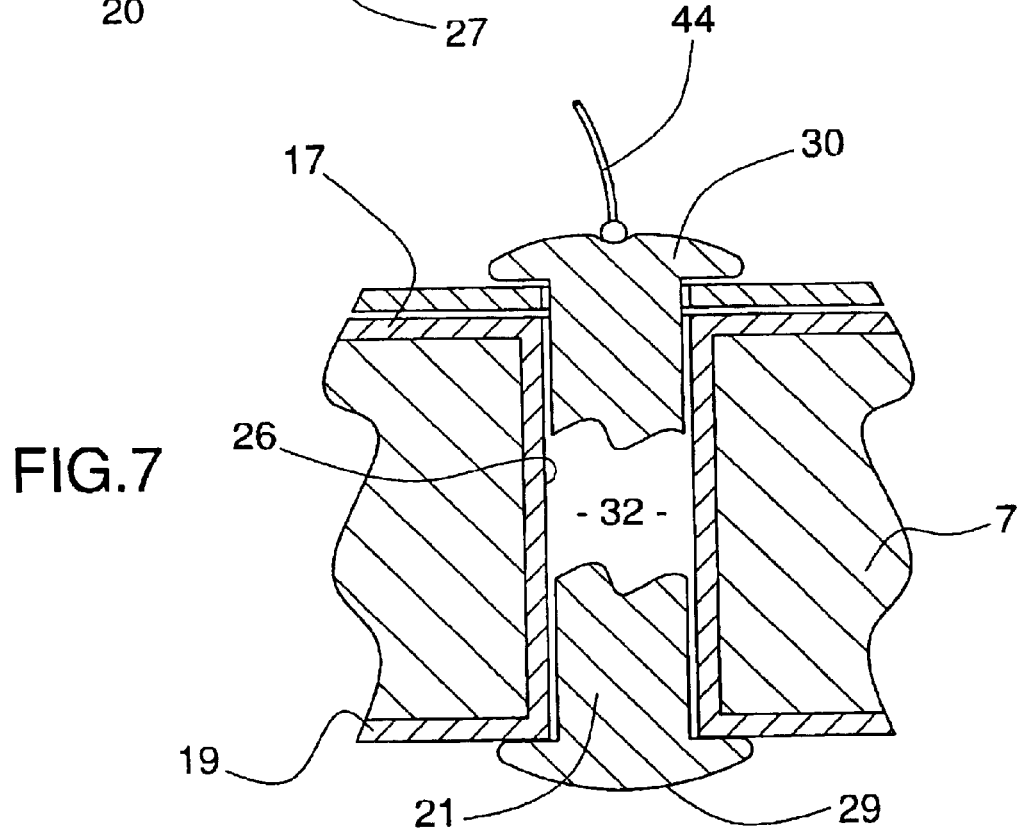
FIG. 7 is an enlarged, schematic, partially cross sectional, fragmentary view of a second rivet in a hole through the detector.

Metal fasteners such as a pair of aluminum rivets 20 and 21 may be used to attach a circular plastic housing 22 to the upper surface 10 of board 7. The housing 22 has an inner bottom cylindrical cup 23 and a removable outer upper cylindrical cap 24. As shown in FIG. 6, rivet 20 extends through a first circular hole 25 that passes through third strip 18 and the board 7 and first strip 16. As shown in FIG. 7, the rivet 21 extends through a second circular hole 26 that passes through fourth strip 19 and the board 7 and second strip 17. The bottom head 27 of the rivet 20 contacts the third strip 18 and the top head 28 of the rivet 20 extends into the cup 23. The bottom head 29 of rivet 21 contacts the fourth strip 19 and the top head 30 of the rivet 21 extends into the cup 23. The top head 28 of rivet 20 and the top head 30 of rivet 21 hold the cup 23 on the board 7. Rivets 20 and 21 also act as current conductors in the leak detection circuit.

The water leak and moisture detection conductor strips 16–19 may be made from copper that is deposited in rectangular configurations or stripes directly on the upper and lower surfaces of the board 7. The holes 25 and 26 are both completely coated with the same copper that is deposited on board 7 to form the strips 16–19. The copper coating 31 in first hole 25 merges into the copper from which both the strips 16 and 18 are made so that the copper coating hole 25 provides a first metallic connector that extends through the board 7 and makes a direct electrical conducting path between the strips 16 and 18. The copper coating 32 in second hole 26 merges into the copper from which both the strips 17 and 19 are made so that the copper coating hole 26 defines a second metallic connector that extends through board 7 and makes a direct electrical conducting path between the strips 17 and 19. The exposed copper surfaces of strips 16–19 and the holes 25 and 26 may be completely coated with gold plating.

Figure 8:
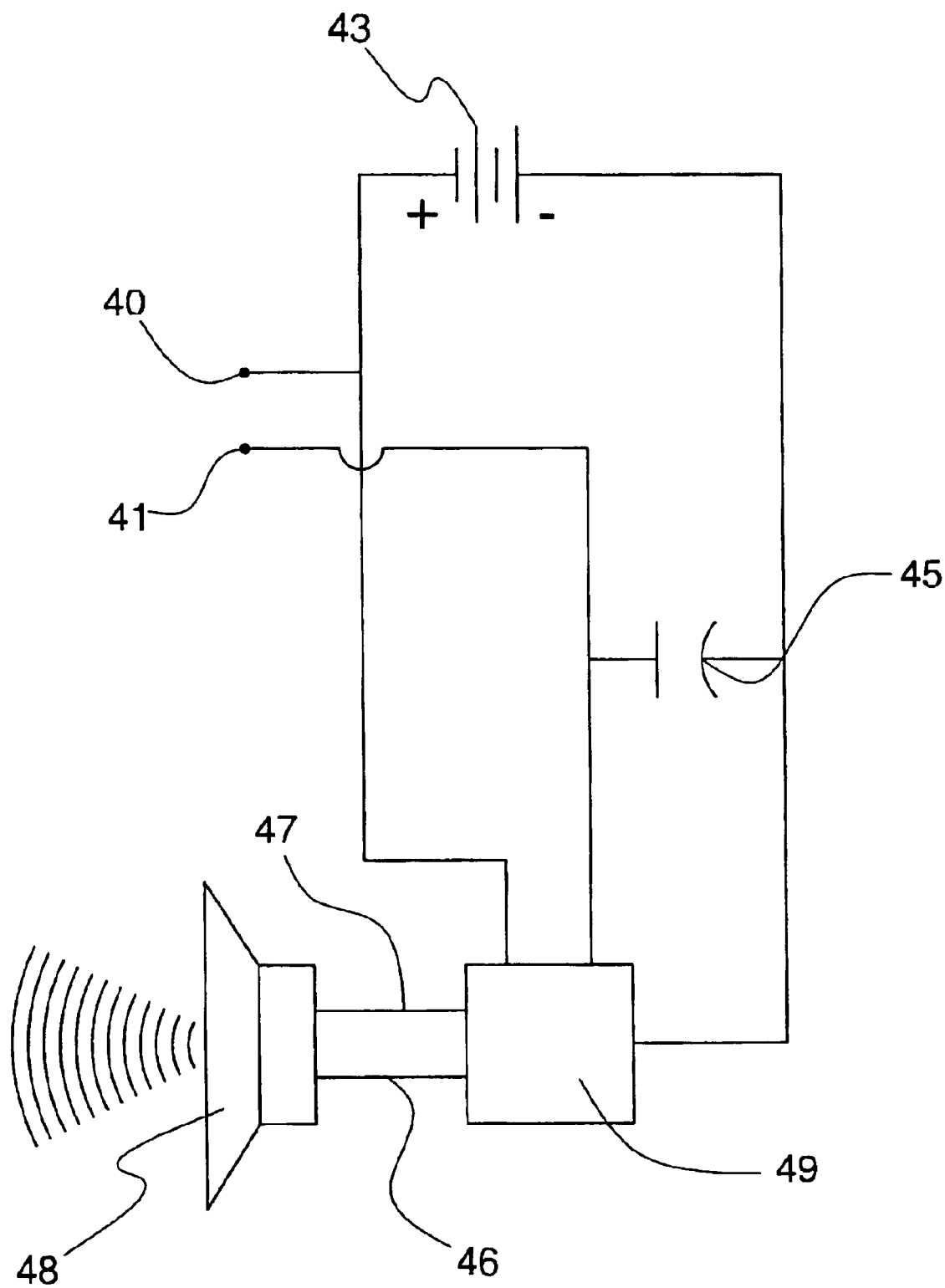
FIG. 8 is a schematic circuit diagram.

Housing 22 contains the components of an electric circuit that detects moisture and sends an audible signal when a water leak occurs. The strips 16–19 are connected to the opposite polarity terminals 40 and 41 of the circuit shown in FIG. 8. One end of a coated conductor wire 42 is attached to the top head 28 of rivet 20 and the other end of wire 42 is attached to terminal 40. This connects the strips 16 and 18 to the positive side of a 1.5 volt DC battery 43. One end of a coated conductor wire 44 is attached to the top head 30 of rivet 21 and the other end of wire 44 is attached to terminal 41. This connects strips 17 and 19 to the negative side of the battery through sound chip 49, such as an EP-03 Sound Effect Module by Touch from Safe Treasure Enterprise Co., Ltd. A capacitor 45 (0.1 uf) may bridge the conductors connecting the negative side of battery 43 and the sound chip 49. The sound chip is connected by coated conductor wires 46 and 47 to a small speaker 48. Water bridging the space between strips 16 and 17 or the space between strips 18 and 19 completes the circuit so that current flows to the sound chip and causes speaker 48 to emit and audible warning signal revealing a leak. The pitch of the audible signal may be sufficiently high that the signal will not be confused with that of a smoke alarm.

The terminals 40 and 41, the capacitor 45 and the sound chip 49 may be held on a printed circuit board 50 that has the conductors 51 for these components and for the battery 43 printed thereon. The battery 43 may be removably held in a conducting sleeve 52 attached to the board 50. A post 53 that extend upwardly from the inside of cup holds the board 50 above the top heads 28 and 30 of the rivets 20 and 21. A pad 54 of insulating plastic foam may be placed between the bottom of speaker 48 and the components on board 50. The cap 24 has a large center hole 55, and the top of speaker 48 extends through the hole 55 above the housing.

The card 1 is also usable to visually display written messages, advertisements and other visible promotional matter, such a business logos, telephone numbers and street and internet addresses. A flat, smooth unobstructed area 60 on the upper surface 10 of board 7 is surrounded by the inner edges of the strip 17. A flat, smooth unobstructed area 61 on the upper lower 11 of board 7 is surrounded by the inner edges of the strip 19. The areas 60 and 61 are capable of having written messages 62 printed directly thereon. Written messages can also be printed on adhesive backed decals or labels 63 which can be affixed to either area 60 or 61.

While the present invention has been described with reference to particular embodiments, it is not intended to illustrate or describe all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

I claim:

1. An integral moisture detector, audible alarm and message display card, comprising: a thin, rigid, non-conducting plastic board having upper and lower flat surfaces, each of said upper and lower surfaces having peripheral end edges, a first moisture detection conductor imprinted on said upper surface of said board around its entire periphery, a second moisture detection conductor imprinted on said upper surface of said board, said second moisture detection conductor being completely circumscribed by said first moisture detection conductor, said second moisture detection conductor being spaced inwardly away from said first moisture detection conductor in a direction away from said peripheral end edges of said upper surface, a third moisture detection conductor imprinted on said lower surface of said board around its entire periphery, a fourth moisture detection conductor imprinted on said lower surface of said board, said fourth moisture detection conductor being completely circumscribed by said third moisture detection conductor, said fourth moisture detection conductor being spaced inwardly away from said third moisture detection conductor in a direction away from said peripheral end edges of said lower surface, a first metallic connector extending through said board and electrically connecting said first and third moisture detection conductors, a second metallic connector extending through said board and electrically connecting said second and fourth moisture detection conductors, a housing on said upper surface of said board, said housing containing a circuit electrically connecting a battery, sound chip and speaker, conductors extending into said housing and being connected to opposite polarity terminals of said circuit so that moisture contacting said moisture detection conductors causes current to flow from said battery to said sound chip so as to activate said speaker to produce audible sound, and there being a flat smooth unobstructed area of one of said surfaces of said board having a written message displayed thereon, said unobstructed area being surrounded by one of said moisture detecting conductors.

2. The integral moisture detector, audible alarm and message display card defined in claim 1, further comprising: said battery being removably held in a conducting sleeve in said housing, and a removable cap on said housing providing access to the interior of said housing for removal and replacement of said battery.

3. The integral moisture detector, audible alarm and message display card defined in claim 2, wherein said removable cap has a center hole and a portion of said speaker extends through said center hole above said housing.

4. The integral moisture detector, audible alarm and message display card defined in claim 1, wherein there is a pair of holes through said board and wherein said first metallic connector comprises a first of said holes that extends through both said first moisture detection conductor and said third moisture detection conductor, said first hole being coated with electrical conducting material that merges into both said first moisture detection conductor and said third moisture detection conductor so as to provide a direct electrical connection between said first moisture detection conductor and said third moisture detection conductor, and wherein said second metallic connector comprises a second of said holes that extends through both said second moisture detection conductor and said fourth moisture detection conductor, said second hole being coated with electrical conducting material that merges into both said second moisture detection conductor and said fourth moisture detection conductor so as to provide a direct electrical connection between said second moisture detection conductor and said fourth moisture detection conductor.

5. The integral moisture detector, audible alarm and message display card defined in claim 1, wherein said moisture detection conductors have exposed surfaces that are coated with gold.

6. The integral moisture detector, audible alarm and message display card defined in claim 1, wherein said written message is displayed on a label that is bonded to one of said flat, smooth, unobstructed areas.

7. An integral water leak detector, audible alarm and message display card, comprising: a thin, rigid, non-conducting solid plastic board having upper and lower flat surfaces, each of said upper and lower surfaces having peripheral end edges, a first water leak detection conductor strip imprinted on said upper surface of said board around its entire periphery, a second water leak detection conductor strip imprinted on said upper surface of said board, said second water leak detection conductor strip being completely circumscribed by said first water leak detection conductor strip, said second water leak detection conductor strip being spaced inwardly away from said first water leak detection conductor strip away from said peripheral end edges of said upper surface, a third water leak detection conductor strip imprinted on said lower surface of said board around its entire periphery, a fourth water leak detection conductor strip imprinted on said lower surface of said board, said fourth water leak detection conductor strip being completely circumscribed by said third water leak detection conductor, said fourth water leak detection conductor strip being spaced inwardly away from said third water leak detection conductor strip away from said peripheral end edges of said lower surface, an electric circuit on said board including an electrically connected battery, sound chip and speaker, metallic conductors connected to opposite polarity terminals of said circuit and connecting said water leak detection conductor strips so that water contacting said water leak detection conductor strips causes current to flow from said battery to said sound chip so as to activate said speaker to produce audible sound, and there being a flat smooth unobstructed area of said upper surface of said board having a written message displayed thereon, said unobstructed area of said upper surface of said board being surrounded by said second water leak detection conductor strip, and there being a flat smooth unobstructed area of said lower surface of said board having a written message displayed thereon, said unobstructed area of said lower surface of said board being surrounded by said fourth water leak detection conductor strip.

8. The integral water leak detector, audible alarm and message display card defined in claim 7, further comprising: a housing on said upper surface of said board, said battery being removably held in a conducting sleeve in said housing, and a removable cap on said housing providing access to the interior of said housing for removal and replacement of said battery.

9. The integral water leak detector, audible alarm and message display card defined in claim 8, wherein said removable cap of said housing has a center hole and a portion of said speaker extends through said center hole above said housing.

10. The integral water leak detector, audible alarm and message display card defined in claim 7, wherein there is a pair of holes through said board, a first of said holes extends through both said first water leak detection conductor strip and said third water leak detection conductor strip, said first hole being coated with electrical conducting material that merges into both said first water leak detection conductor strip and said third water leak detection conductor strip so as to provide a direct electrical connection between said first water leak detection conductor conductor strip and said third water leak detection conductor strip, a second of said holes extends through both said second water leak detection conductor strip and said fourth water leak detection conductor strip, said second hole being coated with electrical conducting material that merges into both said second water leak detection conductor strip and said fourth water leak detection conductor strip so as to provide a direct electrical connection between said second water leak detection conductor strip and said fourth water leak detection conductor strip.

11. The integral water leak detector, audible alarm and message display card defined in claim 7, wherein said water leak detection conductor strips have exposed surfaces coated with gold.

12. The integral water leak detector, audible alarm and message display card defined in claim 7, wherein said written message is displayed on a label that is bonded to one of said flat, smooth, unobstructed areas.

13. The integral water leak detector, audible alarm and message display card defined in claim 7, further comprising: a plastic housing on said upper surface of said board, said battery being removable held in a conducting sleeve in said housing, a removable plastic cap on said housing providing access to the interior of said housing for removal and replacement of said battery, said removable cap having a center hole and a portion of said speaker extends through said center hole above said housing, there being a pair of holes through said board, rivets passing through each of said holes into said housing so as to hold said housing on said upper surface of said board, an upper end of each of said rivets being electrically connected to one of said terminals of said circuit within said housing, and said written message being displayed on a label that is bonded to one of said flat, smooth, unobstructed areas.

14. An integral, portable water leak detector and audible alarm, comprising: a thin, rigid, non-conducting plastic card having upper and lower flat surfaces, each of said upper and lower surfaces having peripheral end edges, a first water leak detection conductor strip imprinted on said upper surface of said card around its entire periphery, a second water leak detection conductor strip imprinted on said upper surface of said card, said second water leak detection conductor strip being completely circumscribed by said first water leak detection conductor strip, said second water leak detection conductor strip being spaced inwardly away from said first water leak detection conductor strip in a direction away from said peripheral end edges of said upper surface, a third water leak detection conductor strip imprinted on said lower surface of said card around its entire periphery, a fourth water leak detection conductor strip imprinted on said lower surface of said board, said fourth water leak detection conductor strip being completely circumscribed by said third water leak detection conductor strip, said fourth water leak detection conductor strip being spaced inwardly away from said third water leak detection conductor strip in a direction away from said peripheral end edges of said lower surface, a first metallic connector extending through said card and electrically connecting said first and third water leak detection conductor strips, a second metallic connector extending through said card and electrically connecting said second and fourth water leak detection conductor strips, a housing on said upper surface of said board, said housing containing a circuit electrically connecting a battery, sound chip and speaker, metal fasteners contacting said first and second metallic connectors and extending into said housing and being connected to opposite polarity terminals of said circuit so that water leak contacting said water leak detection conductor strips cause current to flow from said battery to said sound chip so as to activate said speaker to produce audible sound.

15. The integral, portable water leak detector and audible alarm defined in claim 14, further comprising: said battery being removably held in a conducting sleeve in said housing, and a removable cap on said housing providing access to the interior of said housing for removal and replacement of said battery.

16. The integral, portable water leak detector and audible alarm defined in claim 15, wherein said removable cap has a center hole and a portion of said speaker extends through said center hole above said housing.

17. The integral, portable water leak detector and audible alarm defined in claim 14, wherein there is a pair of holes through said card and wherein said first metallic connector comprises a first of said holes that extends through both said first water leak detection conductor strip and said third water leak detection conductor strip, said first hole being coated with electrical conducting material that merges into both said first water leak detection conductor strip and said third water leak detection conductor strip so as to provide a direct electrical connection between said first water leak detection conductor strip and said third water leak detection conductor strip, and wherein said second metallic connector comprises a second of said holes that extends through both said second water leak detection conductor strip and said fourth water leak detection conductor strip, said second hole being coated with electrical conducting material that merges into both said second water leak detection conductor strip and said fourth water leak detection conductor strip so as to provide a direct electrical connection between said second water leak detection conductor strip and said fourth water leak detection conductor strip.

18. The integral, portable water leak detector and audible alarm defined in claim 14, wherein all of said water leak detection conductor strips and said first and second metallic connectors have exposed surfaces coated with gold.

19. The integral, portable water leak detector and audible alarm defined in claim 14, further comprising: said battery being removably held in a conducting sleeve in said housing, a removable cap on said housing providing access to the interior of said housing for removal and replacement of said battery, said removable cap having a center hole and a portion of said speaker extends through said center hole above said housing, there being a pair of holes through said card, said metal fasteners comprising rivets that pass through each of said holes into said housing so as to hold said housing on said upper surface of said card, and an upper end of each of said rivets being electrically connected to one of said terminals of said circuit within said housing.

20. The integral, portable water leak detector and audible alarm defined in claim 14, further comprising: a flat smooth unobstructed area of one of said surfaces of said card having a written message displayed thereon, said unobstructed area being enclosed within one of said water leak detecting conductor strips.

* * * * *